(12) United States Patent
Patfield et al.

(10) Patent No.: US 7,330,465 B2
(45) Date of Patent: Feb. 12, 2008

(54) AUTO-PROVISIONING FOR A VOICE OVER IP GATEWAY

(75) Inventors: Kevin M. Patfield, Phoenix, AZ (US); David Peter Strand, Scottscale, AZ (US)

(73) Assignee: Lucent Technologies Inc., Murray Hill, NJ (US)

( * ) Notice: Subject to any disclaimer, the term of this patent is extended or adjusted under 35 U.S.C. 154(b) by 992 days.

(21) Appl. No.: 10/699,261

(22) Filed: Oct. 31, 2003

(65) Prior Publication Data

US 2005/0094624 A1  May 5, 2005

(51) Int. Cl.
*H04B 1/06* (2006.01)

(52) U.S. Cl. .................. 370/352; 370/252; 370/401

(58) Field of Classification Search .............. 370/352, 370/252, 401
See application file for complete search history.

(56) References Cited

U.S. PATENT DOCUMENTS

| | | | |
|---|---|---|---|
| 6,144,667 A * | 11/2000 | Doshi et al. | 370/401 |
| 6,591,301 B1 * | 7/2003 | Li et al. | 709/229 |
| 6,594,257 B1 * | 7/2003 | Doshi et al. | 370/352 |
| 6,870,845 B1 * | 3/2005 | Bellovin et al. | 370/392 |
| 6,915,521 B1 * | 7/2005 | Monteiro | 719/316 |
| 6,961,332 B1 * | 11/2005 | Li et al. | 370/352 |
| 7,072,332 B2 * | 7/2006 | D'Souza | 370/352 |
| 7,113,503 B1 * | 9/2006 | Basore et al. | 370/352 |
| 7,151,772 B1 * | 12/2006 | Kalmanek, Jr. et al. | 370/390 |
| 2003/0002512 A1 * | 1/2003 | Kalmanek et al. | 370/401 |

* cited by examiner

*Primary Examiner*—Creighton H. Smith

(57) ABSTRACT

A method of provisioning a gateway (80) is provided in a telecommunications network including a circuit-switched network (90) and a packet-switched network (70). The gateway (80) bridges calls between the circuit-switched network (90) and the packet-switched network (70). The method includes: receiving a registration message from consumer premises equipment (CPE) (60), the message including an address for the CPE (60) on the packet-switched network (70); determining a directory number (DN) for the CPE (60); placing a probe call to the determined DN over the circuit-switched network (90); receiving a call from the circuit-switched network (90), the call being terminated at a call reference value (CRV); recognizing the received call received from the circuit-switched network (90) as the probe call; capturing the CRV at which the probe call is terminated; and, associating the captured CRV with the address for the CPE (60).

24 Claims, 3 Drawing Sheets

AUTO-PROVISIONING FOR A VOICE OVER IP GATEWAY

FIELD

The present inventive subject matter relates to the telecommunications arts. Particular application is found in conjunction with Internet Protocol (IP) telephony, and the specification makes particular reference thereto. However, it is to be appreciated that aspects of the present inventive subject matter are also amenable to other like applications.

BACKGROUND

It is a common practice to use packet-switched networks, such as IP networks, to connect calls (e.g., voice, data or multimedia calls) between end users. For example, Voice over IP (VoIP) has been developed to permit Consumer Premises Equipment (CPE), such as IP telephones, to be connected over an IP network so that end users may exchange voice communications via the connected CPE. Moreover, IP gateways have been developed that bridge IP networks with the Public Switch Telephone Network (PSTN), a circuit-switched network as opposed to a packet-switched network. That is to say, an IP gateway acts as a point of entry for IP calls into the PSTN, e.g., via a telephone switch such as a class 5 switch, and vice versa for calls from the PSTN into the IP network.

Commonly, IP gateways take advantage of the class 5 switch's features to perform call processing, e.g., routing calls. Consider for example, with reference to FIG. 1, a call placed to an IP telephone 10 (i.e., the called party) from a telephone 12 (i.e., the calling party) serviced by the PSTN 20. The call is first routed over the PSTN 20 to a terminating telecommunications switch, such as a class 5 switch 22 or the like. From the switch 22, the call is routed over an IP network 30 in a VoIP format. An IP gateway 32 receives the call from the switch 22, performs the appropriate conversions to route the call between the circuit-switched and packet-switched networks, and routes the call over the IP network 30 to the IP telephone 10 to complete the connection. While generally the call may in practice be placed from any CPE (including other IP telephones), for the purposes of this example, the calling party is assumed to be using the telephone 12. Furthermore, it is to be appreciated that there is likely a plurality of IP telephones that are situated similar to the IP telephone 10 and served by the gateway 32.

It is to be appreciated, as is commonly the case, that when placing the call to the IP telephone 10, the calling party simply dials a directory number (DN) with the telephone 12 in the usual manner. In this case, for example, the DN for the IP telephone 10 is 555-1234. However, the IP telephone 10 is typically identified within the IP network 30 by an IP address. Accordingly, the switch 22 and the gateway 32 have to be provisioned to associate corresponding IP addresses with their appropriate DNs. As is known in the art, the provisioning of the switch 22 is typically carried out via an operations support system (OSS) 40.

With respect to the provisioning of the gateway 32, programming the associations into the gateway 32 is a significant undertaking since every one of typically thousands of such associations has to be specified. For this reason, manual techniques are often not practical for provisioning the gateway 32. On the other hand, provisioning the gateway 32 via the OSS 40 (as shown in FIG. 1) can mean making considerable changes to a service provider's operation systems and/or customizing the OSS 40 beyond the capability already in place to provision the switch 22. Such a proposition may be deemed undesirable due to the attendant expenses. Moreover, provisioning the gateway 32 is further complicated as additional CPE (e.g., IP telephones) to be served by the gateway 32 are add or installed, or current CPE served by the gateway 32 are removed or uninstalled.

Accordingly, a new and improved system, gateway and/or technique for provisioning the same is disclosed that overcomes the above-referenced problems and others.

SUMMARY

In accordance with one preferred embodiment, a method of provisioning a gateway is provided in a telecommunications network including a circuit-switched network and a packet-switched network. The gateway bridges calls between the circuit-switched network and the packet-switched network. The method includes: receiving a registration message from consumer premises equipment (CPE), the message including an address for the CPE on the packet-switched network; determining a directory number (DN) for the CPE; placing a probe call to the determined DN over the circuit-switched network; receiving a call from the circuit-switched network, the call being terminated at a call reference value (CRV); recognizing the received call received from the circuit-switched network as the probe call; capturing the CRV at which the probe call is terminated; and, associating the captured CRV with the address for the CPE.

In accordance with another preferred embodiment, a gateway is provided in a telecommunications network including a circuit-switched network and a packet-switched network. The gateway bridges calls between the circuit-switched network and the packet-switched network. The gateway includes: registration means for registering consumer premises equipment (CPE) with the gateway by receiving over the packet-switched network a registration message from the CPE, the registration message including an address for the CPE on the packet-switched network; obtaining means for obtaining a directory number (DN) for the CPE; calling means for placing a probe call to the obtained DN over the circuit-switched network; reception means for receiving a call from the circuit-switched network, the call being terminated at a call reference value (CRV); recognition means for recognizing the call received by the reception means as the probe call; means for capturing the CRV at which the probe call is terminated; and, means for associating the captured CRV with the address for the CPE.

In accordance with yet another preferred embodiment, a gateway is provided for bridging calls between a circuit-switched network and a packet-switched network. The gateway serves a plurality of consumer premises equipment (CPE) having addresses on the packet-switched network and the gateway is operatively connected to the circuit-switched network via a telecommunications switch that is part of the circuit switched network. The gateway includes: a database that relates a plurality of call reference values (CRV) to associated addresses of the CPE served by the gateway; registration means for registering CPE with the gateway by receiving over the packet-switched network registration messages from the CPE, the registration messages including addresses for the CPE on the packet-switched network; and, provisioning means for automatically building and maintaining the database. The provisioning acting to: obtain directory numbers (DNs) for the CPE; place probe calls to the obtained DNs over the circuit-switched network, each of the probe calls being routed by the telecommunications switch to be terminated on the gateway at a call reference value (CRV); detect if calls incoming from the telecommunication switch are probe calls; capture the CRVs at which detected probe calls are terminated; and, associate the captured CRVs with the addresses for the CPE, the associated CRVs and addresses being stored and maintained in the database.

Numerous advantages and benefits of the inventive subject matter disclosed herein will become apparent to those of ordinary skill in the art upon reading and understanding the present specification.

BRIEF DESCRIPTION OF THE DRAWINGS

Preferred embodiments may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION OF PREFERRED EMBODIMENTS

For clarity and simplicity, the present specification shall refer to structural and/or functional network elements, entities and/or facilities, relevant communications standards, protocols and/or services, and other components that are commonly known in the telecommunications art without further detailed explanation as to their configuration or operation except to the extent they have been modified or altered in accordance with and/or to accommodate the preferred embodiment(s) presented.

Figure 1:
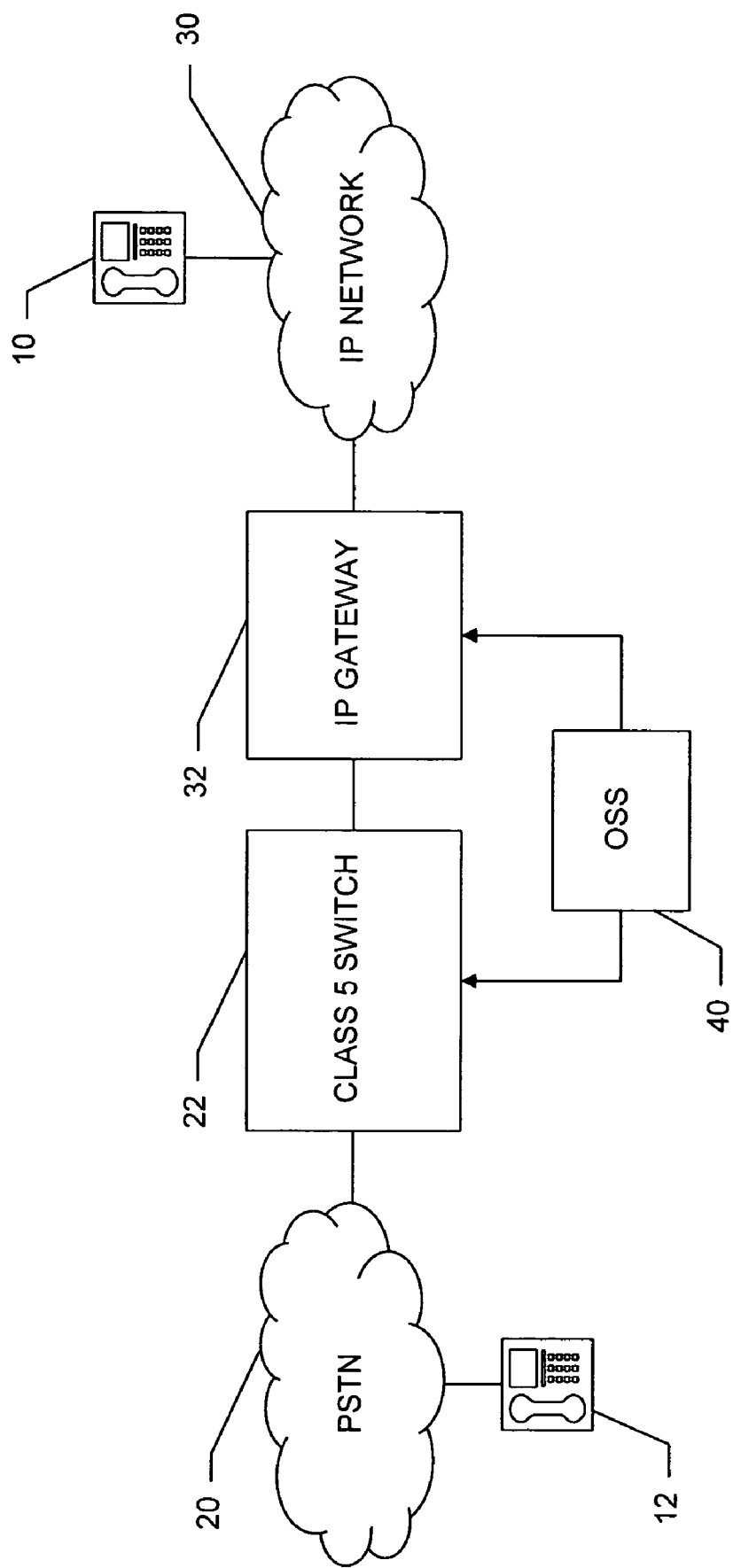
FIG. 1 is a block diagram showing a conventional telecommunications system employing a VoIP gateway.
Figure 2:
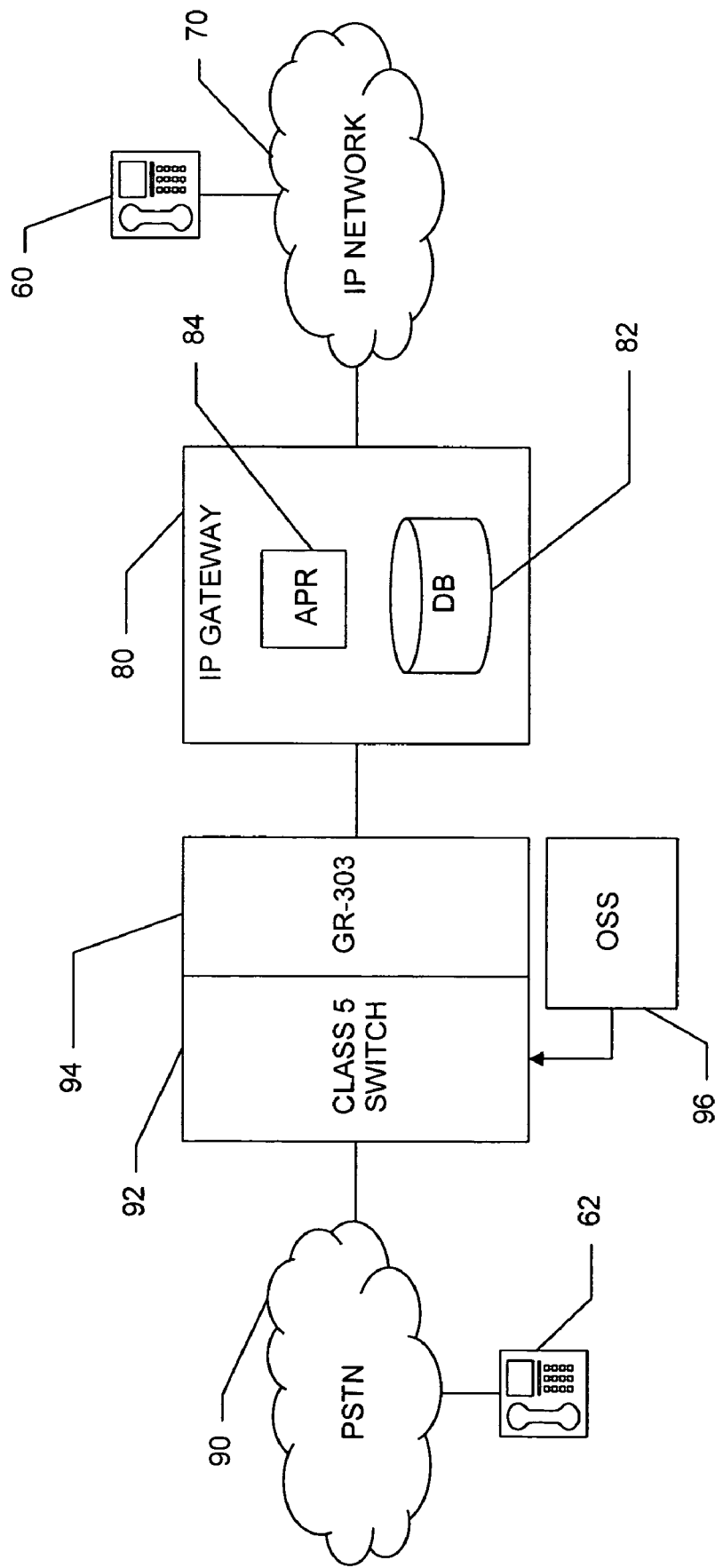
FIG. 2 is a block diagram showing a telecommunications system including an IP gateway in accordance with an exemplary embodiment of the same.

FIG. 2 shows an exemplary telecommunications system in accordance with a preferred embodiment of the same, including CPE 60 and 62, an IP network 70, an IP gateway 80, a PSTN 90, and a telecommunications switch 92. It is to be appreciated that while the network 70 and gateway 80 have been referred to as an IP network and IP gateway, the network 70 and/or gateway 80 may be of any suitable packet-switched type. For illustrative purposes, CPE 60 is shown as an IP telephone, e.g., used to conduct a VoIP call. However, it is to be appreciated that the CPE 60 may be any appropriate type of CPE as is known in the art for conducting various types of IP or packet-switch calls, e.g., voice, data, multimedia, etc. Similarly, the CPE 62 is shown as a telephone. However, it is to be appreciated that the CPE 62 may also be any appropriate type of CPE as is known in the art for conducting various types of circuit-switched calls. Further, it is to be appreciated that while only the one particular CPE (i.e., CPE 60) is shown, a plurality of such CPE may be similarly situated and served by the gateway 80. Also, for simplicity and clarity, only a single switch 92, a single gateway 80 and a single CPE 62 have been shown in FIG. 2. It is to be appreciated, however, that a plurality of similarly situated network elements operating in like manner optionally exist within the system.

As shown, the CPE 60 is operatively connected to the IP network 70, or another like packet-switched network, and the CPE 62 is operatively connected to the PSTN 90, so that end users employing the same may exchange communications with one another. The IP gateway 80 bridges the IP network 70 with the PSTN 90. That is to say, the IP gateway 80 acts as a point of entry for packet-switched calls from the IP network 70 headed into the PSTN 90, and similarly acts as a point of entry for circuit-switched calls from the PSTN 90 headed into the IP network 70. In the usual manner, the IP gateway 80 selectively converts and/or translates packet-switched calls into circuit-switched calls and vice versa depending on the direction of traffic flow.

Suitably, the telecommunications switch 92 (e.g., a class 5 switch or the like) on the PSTN side of the IP gateway 80 interfaces with the IP gateway 80, e.g., via a GR-303 interface 94, or another like interface such as a V.5.2 interface. Use of the GR-303 interface 94, the V.5.2 interface or the like, is advantageous insomuch as from the perspective of the switch 92 the IP gateway 80 acts and/or otherwise appears as a remote digital terminal (RDT) while continuing to appear from the IP side as a gateway into the PSTN 90. The switch 92 is responsible for call routing and optionally provides other call processing and/or call features normally associated therewith. Suitably, the switch 92 is provisioned in the usual manner, e.g., via OSS 96.

A normal operation of the system shall now be described by way of reference to an exemplary voice call placed from the CPE 62 (i.e., the calling party) to the CPE 60 (i.e., the called party) which is served by the gateway 80. For purposes of this example, it is assumed that the respective network elements (i.e., the switch 92, the gateway 80, and the CPE 60) have already been properly provisioned. While generally the call may in practice be placed from any CPE (including other IP telephones), for the purposes of this example, the calling party is assumed to be using the CPE 62.

The calling party initiates the call by using CPE 62 in the usual manner by dialling the DN of the CPE 60. In this case, for example, the DN for the CPE 60 is 555-4321. Given that the proper provisioning has already taken place, the DN is associated with a particular switch within the PSTN 90 (namely, in this case, the switch 92 that serves the gateway 80) and an interface group and a call reference value (CRV) for an interface within that particular switch (namely, in this case, the interface 94 that provides the interface between the switch 92 and the gateway 80). Accordingly, the call is first routed over the PSTN 90 to the appropriate switch 92, more specifically, to the interface group of the interface 94 that provides the interface with the gateway 80.

The switch 92, via interface 94, then terminates the call on the gateway 80 at the designated CRV where the gateway 80 picks up the call. Again, assuming that the gateway 80 is properly provisioned, the CRV is associated with a particular IP address, for example, in a database (DB) 82. Note, provisioning the gateway 80 essentially involves assigning the CRVs to, or otherwise associating them with, the IP addresses served by the gateway 80, i.e., building the database 82, as will be described in more detail elsewhere.

The gateway 80 then performs the appropriate translating, converting, packetizing, etc., to route the call between the circuit-switch and packet-switched networks. Finally, having identified the corresponding IP address associated with the CRV from which the call was picked up, the call is routed from the gateway 80 over the IP network 70 (e.g., using a VoIP format) to the appropriate IP address, namely, in this case, the IP address corresponding to the CPE 60. In this manner, connection of the call is completed.

As shown in FIG. 2, the gateway 80 is provisioned with and/or supports an automatic provisioning resource (APR) 84 that carries out and/or administers automatic provisioning of the gateway 80. Suitably, the APR 84 is designated a maintenance number (MN) assigned for the purpose of auto-provisioning the gateway 80. Furthermore, the APR 84 is equipped to, or is otherwise capable of, placing calls over a separate maintenance CRV associated with the MN, and is also optionally equipped to, or otherwise capable of, receiving calls directed to the MN.

Figure 3:
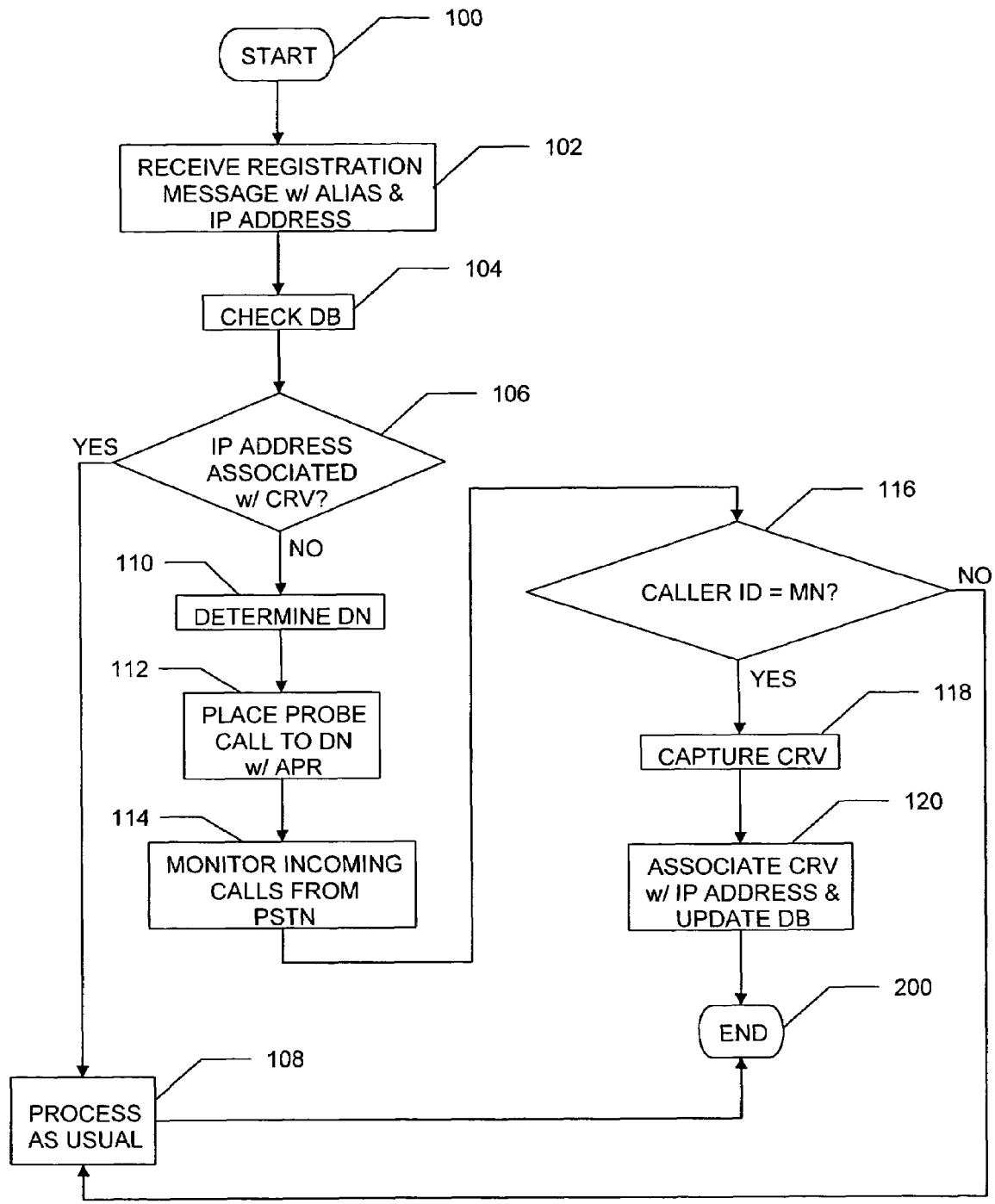
FIG. 3 is a flow chart showing a process for automatically provisioning an IP gateway in accordance with an exemplary embodiment of the process.

FIG. 3 shows a process and/or method by which an IP gateway is automatically provisioned in accordance with an exemplary embodiment of the same. To better understand the process and/or method, an exemplary provisioning of the IP gateway 80 shall now be described with reference to the installation of the CPE 60. For illustrative purposes, only the installation of one particular CPE (i.e., CPE 60) is described. However, it is to be appreciated that a plurality of similarly situated CPEs may likewise be installed and the gateway 80 provisioned accordingly.

The process begins at start step 100 with the installation of the CPE 60. Preferably, the CPE 60 is provisioned with its own IP address and an alias, as is known in the art. By convention, many service providers include the DN as part of the alias; however, this is not always the case.

At step 102, the CPE 60 sends a registration message to the gateway 80. The registration message takes the form of a data message or IP message including the CPE's alias and IP address on the IP network 70. Generally, the registration message is sent by the CPE 60 autonomously to the gateway 80 when the CPE 60 has itself been provisioned and is able to contact the gateway 80. In this manner, the CPE 60 is registered with the gateway 80.

Next, at step 104, the DB 82 is queried or checked by the APR 84 to see if the IP address in the registration message received by the gateway 80 is already associated with a CRV.

If, at decision step 106, it is determined that the received IP address is in fact already associated with a CRV, then the gateway 80 has already been provisioned to serve the CPE 60. Accordingly, the registration message is deemed not to correspond to a provisioning request and it is consequently otherwise processed in the usual manner at step 108 (i.e., as registration messages are routinely handled), and the process then flows to the end step 200.

On the other hand, if, at decision step 106, it is determined that the received IP address is not already associated with a CRV, then the gateway 80 is not yet provisioned to serve the CPE 60. Accordingly, the registration message is deemed to correspond to a provisioning request and therefore the process flows to step 110 so that the gateway 80 will be automatically provisioned accordingly.

Upon recognition of a provisioning request, the APR 84 is activated to automatically provision the gateway 80 with respect to the CPE 60.

At step 110, the DN for the CPE 60 is determined by the APR 84. Suitably, the alias obtained from the registration message is examined to see if the DN is included therein. When available, the DN is extracted from the alias transmitted along with the registration message received by the gateway 80 in step 102. Alternately, if the alias does not include the DN, the APR 84 prompts the CPE 60 to provide the DN for the CPE 60. Optionally, the CPE 60 may be provisioned with its own DN that is then automatically returned in a DN identification call or pseudo-call placed to the MN in response to the prompt. Alternately, the prompt takes the form of a tone or other cue sent to the CPE 60, which would inform a end user or installer to manually enter the DN for the CPE 60, the manually entered DN then being provided in the DN identification call placed to the MN. In former case (i.e., when the alias provisioned in the CPE 60 includes the DN for the CPE 60), the DN for the CPE 60 is automatically obtained (via the alias) when the CPE 60 is registered with the gateway 80. In the latter case (i.e., when the alias provisioned in the CPE 60 does not include the DN for the CPE 60), the DN for the CPE 60 is obtained when the DN identification call is placed to the MN. In either case, the DN (in one form or another) and the IP address for the CPE 60 are both made available to the APR 84.

At step 112, the APR 84 places a probe call to the DN determined from step 110. The probe call determines the identity of the particular CRV that is to be associated with the IP address of the CPE 60, i.e., the IP address obtained in step 102. More specifically, the probe call is passed to the switch 92 via the interface 94. Provided the switch 92 is properly provisioned (i.e., the switch 92 accurately associates the called DN with the corresponding interface group and CRV designated for that DN in the interface 94), the switch 92 will terminate the probe call on the gateway 80 at the CRV designated for the DN, although the CRV will not currently be associated by the gateway 80 with an IP address.

At step 114, the gateway 80 monitors and/or checks incoming calls from the PSTN side (i.e., from the switch 92) to detect and/or identify probe calls. That is to say, the probe calls are distinguished from ordinary calls (i.e., non-probe calls) passing through the gateway 80 in the normal course of events. Various techniques are optionally employed to identify a probe call. For example, the APR 84 optionally marks or otherwise tags the probe call with a detectable signal or data that identifies it as such when the probe call is placed by the APR 84. Alternately, as shown in FIG. 3, caller identification (ID) is employed to identify the probe call. That is to say, caller ID is used to obtain the number from which a call originates.

At decision step 116, it is determined if the caller ID is equal to or otherwise identifies the MN. If the caller ID does not equal the MN, then the call is recognized as not being the probe call insomuch as it did not originate from the APR 84. In this case, the process flows back to step 108 and continues accordingly. That is to say, the call is handled in the usual manner (e.g., connecting to the called party) and the process ends.

On the other hand, if, at decision step 116, it is determined that the caller ID does in fact equal the MN, then the call is recognized as the probe call insomuch as it did originate from the APR 84. In this case, the process continues on to step 118 to complete the provisioning of the gateway 80. At step 118, the CRV, through which the probe call is picked up by the gateway 80, is captured. The captured CRV is associated with the IP address obtained in step 102 (i.e., the IP address for the CPE 60), and the DB 82 is updated accordingly, at step 120. That is to say, the CRV and IP address are stored in the DB 82 so as to reference or relate one to the other. Having completed provisioning of the gateway 80 with respect to the CPE 60, the process then continues to end step 200.

As will be appreciate by those of ordinary skill in the art, each of the CPE served by the gateway 80 are similarly handled. In this manner, the DB 82 is built and the gateway 80 is automatically provisioned for all the CPE it serves. Essentially, the approach taken provides for automatic provisioning of the gateway 80 by allowing the gateway 80 to discover its own line provisioning information based upon the provisioning already contained within the CPE and the PSTN.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. In a telecommunications network including a circuit-switched network and a packet-switched network, a method of provisioning a gateway bridging calls between the circuit-switched network and the packet-switched network, said method comprising:
   (a) receiving a registration message from consumer premises equipment (CPE), the message including an address for the CPE on the packet-switched network;
   (b) determining a directory number (DN) for the CPE;
   (c) placing a probe call to the determined DN over the circuit-switched network;
   (d) receiving a call from the circuit-switched network, said call being terminated at a call reference value (CRV);
   (e) recognizing the received call received from the circuit-switched network as the probe call;
   (f) capturing the CRV at which the probe call is terminated; and,
   (g) associating the captured CRV with the address for the CPE.

2. The method of claim 1, further comprising:
providing a maintenance number (MN) for provisioning the gateway; and,
step (b) includes receiving a DN identification call directed to the MN from the CPE, said DN identification call identifying the DN for the CPE.

3. The method of claim 1, wherein the registration message also includes an alias for the CPE, said alias including the DN for the CPE, and step (b) includes:
extracting the DN for the CPE from the alias.

4. The method of claim 1, further comprising:
maintaining CRVs and addresses for CPE in a database such that the CRVs and addresses for CPE in the database reference their associated counterparts.

5. The method of claim 4, further comprising:
determining if the address for the CPE accompanying the registration message is already associated with a CRV, such that if the address is not already associated with a CRV then steps (b)-(g) are carried out, otherwise steps (b)-(g) are omitted.

6. The method of claim 5, further comprising:
accessing the database to determine if the address for the CPE accompanying the registration message is already associated with a CRV.

7. The method of claim 1, further comprising:
(h) storing the CRV and address for the CPE associated with one another in step (g) in a database.

8. The method of claim 1, wherein the probe call placed in step (c) originates from a maintenance number (MN), and step (e) includes:
using caller identification (ID) to obtain an originating number for the received call; and,
comparing the obtained originating number with the MN, such that if the obtained originating number and the MN substantially match one another, then the received call is recognized as the probe call.

9. The method of claim 1, further comprising:
tagging the placed probe call with a detectable identifier; and,
step (e) includes monitoring calls coming into the gateway from the circuit-switched network to detect the identifier, such that if identifier is detected, then the received call is recognized as the probe call.

10. In a telecommunications network including a circuit-switched network and a packet-switched network, a gateway bridging calls between the circuit-switched network and the packet-switched network, said gateway comprising:
registration means for registering consumer premises equipment (CPE) with the gateway by receiving over the packet-switched network a registration message from the CPE, said registration message including an address for the CPE on the packet-switched network;
obtaining means for obtaining a directory number (DN) for the CPE;
calling means for placing a probe call to the obtained DN over the circuit-switched network;
reception means for receiving a call from the circuit-switched network, said call being terminated at a call reference value (CRV);
recognition means for recognizing the call received by the reception means as the probe call;
means for capturing the CRV at which the probe call is terminated; and,
means for associating the captured CRV with the address for the CPE.

11. The gateway of claim 10, wherein the obtaining means is assigned a maintenance number (MN) for provisioning the gateway, said obtaining means obtaining the DN for the CPE by receiving a DN identification call directed to the MN from the CPE, said DN identification call identifying the DN for the CPE.

12. The gateway of claim 10, wherein the registration message also includes an alias for the CPE, said alias including the DN for the CPE, and said obtaining means obtains the DN for the CPE by extracting the DN for the CPE from the alias.

13. The gateway of claim 10, further comprising:
a database for storing and maintaining CRVs and addresses for CPE such that the CRVs and addresses for CPE in the database reference their associated counterparts.

14. The gateway of claim 13, further comprising:
decision means for determining if the address for the CPE accompanying the registration message is already associated with a CRV.

15. The gateway of claim 14, wherein the decision means accesses the database to determine if the address for the CPE accompanying the registration message is already associated with a CRV.

16. The gateway of claim 10, further comprising:
a database into which the CRV and address for the CPE associated therewith are stored.

17. The gateway of claim 10, wherein the calling means is provided with a maintenance number (MN), and the recognition means includes:
caller identification (ID), said caller ID obtaining an originating number for the call received by the reception means, said recognition means comparing the obtained originating number with the MN, such that if the obtained originating number and the MN substantially match one another, then the call received by the reception means is recognized as the probe call.

18. The gateway of claim 10, further comprising:
tagging means for tagging the probe call placed by the calling means with a detectable identifier, said recognition means monitoring calls coming into the gateway from the circuit-switched network to detect the identifier, such that if identifier is detected, then the call received by the reception means is recognized as the probe call.

19. A gateway bridging calls between a circuit-switched network and a packet-switched network, said gateway serving a plurality of consumer premises equipment (CPE) having addresses on the packet-switched network and said gateway being operatively connected to the circuit-switched network via a telecommunications switch that is part of the circuit switched network, said gateway comprising:
a database that relates a plurality of call reference values (CRV) to associated addresses of the CPE served by the gateway;
registration means for registering CPE with the gateway by receiving over the packet-switched network registration messages from the CPE, said registration messages including addresses for the CPE on the packet-switched network; and,
provisioning means for automatically building and maintaining the database, said provisioning means acting to:
obtain directory numbers (DNs) for the CPE;
place probe calls to the obtained DNs over the circuit-switched network, each of said probe calls being routed by the telecommunications switch to be terminated on the gateway at a call reference value (CRV);
detect if calls incoming from the telecommunication switch are probe calls;
capture the CRVs at which detected probe calls are terminated; and,
associate the captured CRVs with the addresses for the CPE, said associated CRVs and addresses being stored and maintained in the database.

20. The gateway of claim 19, wherein the packet-switched network is an Internet protocol (IP) network.

21. The gateway of claim 19, wherein an interface is arranged between the gateway and the telecommunications switch thereby operatively connecting them to one another such that from the perspective of the telecommunications switch the gateway appears to behave as a remote digital terminal.

22. The gateway of claim 21, wherein the telecommunications switch is a class 5 switch.

23. The gateway of claim 22, wherein the interface is a GR-303 interface.

24. The gateway of claim 22, wherein the interface is a V.5.2 interface.

* * * * *